US007593917B2

(12) United States Patent
Werner

(10) Patent No.: US 7,593,917 B2
(45) Date of Patent: Sep. 22, 2009

(54) IMPLEMENTATION OF APPLICATION MANAGEMENT OPERATIONS

(75) Inventor: Randolf Werner, Wiesloch-Baiertal (DE)

(73) Assignee: SAP AG, Walldorf (DE)

(*) Notice: Subject to any disclaimer, the term of this patent is extended or adjusted under 35 U.S.C. 154(b) by 279 days.

(21) Appl. No.: 11/027,387

(22) Filed: Dec. 30, 2004

(65) Prior Publication Data

US 2006/0149827 A1    Jul. 6, 2006

(51) Int. Cl.
    *G06F 17/30* (2006.01)
(52) U.S. Cl. .......................... 707/1; 709/203
(58) Field of Classification Search ........... 707/100, 707/1; 709/217, 223, 203
    See application file for complete search history.

(56) References Cited

U.S. PATENT DOCUMENTS

| 5,742,762 | A  | * | 4/1998  | Scholl et al. ............... 709/200 |
| 5,999,179 | A  |   | 12/1999 | Kekic et al. |
| 6,145,001 | A  | * | 11/2000 | Scholl et al. ............... 709/223 |
| 6,282,566 | B1 |   | 8/2001  | Lee, Jr. et al. |
| 6,345,386 | B1 |   | 2/2002  | Delo et al. |
| 6,356,946 | B1 | * | 3/2002  | Clegg et al. ................. 709/231 |
| 6,424,828 | B1 |   | 7/2002  | Collins et al. |
| 6,553,377 | B1 | * | 4/2003  | Eschelbeck et al. .......... 707/10 |
| 6,567,808 | B1 | * | 5/2003  | Eschelbeck et al. .......... 707/10 |
| 6,769,022 | B1 | * | 7/2004  | DeKoning et al. .......... 709/223 |
| 6,915,309 | B1 | * | 7/2005  | Conley et al. ............ 707/104.1 |
| 7,024,695 | B1 |   | 4/2006  | Kumar et al. |
| 7,035,840 | B2 | * | 4/2006  | Nakos et al. .................... 707/2 |
| 7,181,436 | B1 | * | 2/2007  | Conley et al. ................... 707/1 |
| 7,203,769 | B2 |   | 4/2007  | Schnier |
| 7,296,267 | B2 |   | 11/2007 | Cota-Robles et al. |
| 7,302,423 | B2 |   | 11/2007 | De Bellis |
| 2002/0078060 | A1 |   | 6/2002  | Garst et al. |
| 2002/0129264 | A1 |   | 9/2002  | Rowland et al. |
| 2003/0014521 | A1 |   | 1/2003  | Elson et al. |
| 2003/0084248 | A1 |   | 5/2003  | Gaither et al. |
| 2003/0177356 | A1 |   | 9/2003  | Abela |
| 2003/0177382 | A1 |   | 9/2003  | Ofek et al. |
| 2003/0195923 | A1 |   | 10/2003 | Bloch et al. |
| 2003/0212654 | A1 |   | 11/2003 | Harper et al. |
| 2004/0003033 | A1 |   | 1/2004  | Kamen et al. |
| 2004/0024971 | A1 |   | 2/2004  | Bogin et al. |

(Continued)

FOREIGN PATENT DOCUMENTS

WO    WO-00/23898    4/2000

OTHER PUBLICATIONS

"What is LDAP?", http://www.gracion.com/server/whatldap.html, (Dec. 7, 2004).

(Continued)

*Primary Examiner*—Jean B. Fleurantin
*Assistant Examiner*—Joshua Bullock
(74) *Attorney, Agent, or Firm*—Blakely Sokoloff Taylor & Zafman

(57) ABSTRACT

A system and method for a connection resource system is disclosed. According to an embodiment of the invention, a server includes an interface to provide a connection for a client, an application to be managed by a client via the interface, and a registry, the registry including an entry for the application to be managed, the entry including one or more attributes for the management of the application.

24 Claims, 7 Drawing Sheets

U.S. PATENT DOCUMENTS

| | | | |
|---|---|---|---|
| 2004/0181537 | A1 | 9/2004 | Chawla et al. |
| 2004/0205144 | A1 | 10/2004 | Otake |
| 2005/0278346 | A1 | 12/2005 | Shang et al. |
| 2006/0053112 | A1 | 3/2006 | Chitkara et al. |
| 2006/0150197 | A1 | 7/2006 | Werner |
| 2006/0167980 | A1* | 7/2006 | Werner .................. 709/203 |
| 2006/0168646 | A1 | 7/2006 | Werner |
| 2006/0206856 | A1 | 9/2006 | Breeden et al. |

OTHER PUBLICATIONS

Tuttle, Steven, et al., "Understanding LDAP Design and Implemenation", IBM.com Redbooks, (Jun. 2004), 1-774.

USPTO, "FOA Mailed Aug. 19, 2008 for U.S. Appl. No. 11/027,812", Whole Document.

"FOA Mailed Aug. 17, 2007 for U.S. Appl. No. 11/013,277", Whole Document.

"OA Mailed Jan. 7, 2008 for U.S. Appl. No. 11/013,277", Whole Document.

"OA Mailed Mar. 12, 2007 for U.S. Appl. No. 11/013,277", Whole Document.

"FOA Mailed Aug. 17, 2007 for U.S. Appl. No. 11/013,278", Whole Document.

"OA Mailed Feb. 5, 2008 for U.S. Appl. No. 11/013,278", Whole Document.

"OA Mailed Mar. 16, 2007 for U.S. Appl. No. 11/013,278", Whole Document.

"FOA Mailed Aug. 28, 2007 for U.S. Appl. No. 11/012,803", Whole Document.

"OA Mailed Jan. 24, 2008 for U.S. Appl. No. 11/012,803", Whole Document.

"OA Mailed Mar. 16, 2007 for U.S. Appl. No. 11/012,803", Whole Document.

"OA Mailed Feb. 21, 2008 for U.S. Appl. No. 11/027,812", Whole Documents.

Non-Final Office Action for U.S. Appl. No. 11/013,278, Mailed Dec. 23, 2008, 28 pages.

Non-Final Office Action for U.S. Appl. No. 11/012,803, Mailed Dec. 23, 2008, 22 pages.

Non-Final Office Action for U.S. Appl. No. 11/026,604, Mailed Dec. 30, 2008, 18 pages.

"FOA Mailed Aug. 13, 2008 for U.S. Appl. No. 11/013,278 Whole Document".

Galchev, Galin, "Plug-In Based Caching Architecture Capable of Implementing Multiple Cache Regions Per Application", U.S. Appl. No. 11/024,554, filed Dec. 28, 2004—Non-Final Office Action mailed May 28, 2008, 7 pgs.

USPTO, "OA Mailed Sep. 4, 2008 for U.S. Appl. No. 11/026,323", Whole Document.

Non-Final Office Action for U.S. Appl. No. 11/026,604, Mailed Jan. 27, 2009, 18 pages.

Notice of Allowance for U.S. Appl. No. 11/026,323, Mailed Feb. 25, 2009, 19 pages.

Final Office Action for U.S. Appl. No. 11/012,803, Mailed Jul. 22, 2008, 22 pages.

Final Office Action for U.S. Appl. No. 11/013,277, Mailed Aug. 7, 2008, 22 pages.

Non-Final Office Action for U.S. Appl. No. 11/013,277, Mailed Jan. 6, 2009, 22 pages.

Non-Final Office Action for U.S. Appl. No. 11/027,812, Mailed Apr. 2, 2009, 19 pages.

Notice of Allowance for U.S. Appl. No. 11/012,803, Mailed Jun. 10, 2009, 27 pages.

Notice of Allowance for U.S. Appl. No. 11/013,278, Mailed Jun. 11, 2009, 25 pages.

"Notice of Allowance for U.S. Appl. No. 11/013,277, Mailed Jun. 25, 2009, 24 pages".

* cited by examiner

IMPLEMENTATION OF APPLICATION MANAGEMENT OPERATIONS

TECHNICAL FIELD

Embodiments of the invention generally relate to the field of client/server systems and, more particularly, to a system and method for implementation of application management operations.

BACKGROUND

A system may provide for connection with external processes. The connection may be made by using a program or object, including a snap-in, that attaches or connects with the system and acts as a part of the system. In one possible example, an external client may connect with a server for the purpose of managing an application, with the external client utilizing one of a number of different platforms. The external client may connect with the system using a program object that attaches to an interface of the server. The program object may act as a part of the attached system for the purposes of system management.

However, the environment of a system may complicate connection implementation. If a server is host to multiple different client systems, with the client systems using varying computer platforms, the connection process should be available for each of the possible client systems. The variety of attributes of client systems may cause difficulty in providing information regarding a system to be managed to multiple different types of clients.

SUMMARY OF THE INVENTION

A system and method for implementation of application management operations are described.

According to a first embodiment of the invention, a server includes an interface, with the interface to provide a connection for a client. The server includes an application to be managed by a client. The server further includes a registry, with the registry including an entry for the application to be managed. The entry includes one or more attributes for the management of the application.

Under a second embodiment of the invention, a method includes generating an entry in a directory for an application and receiving a request from a client for a connection to the directory to manage the application. The method further includes providing information regarding the application in the directory.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
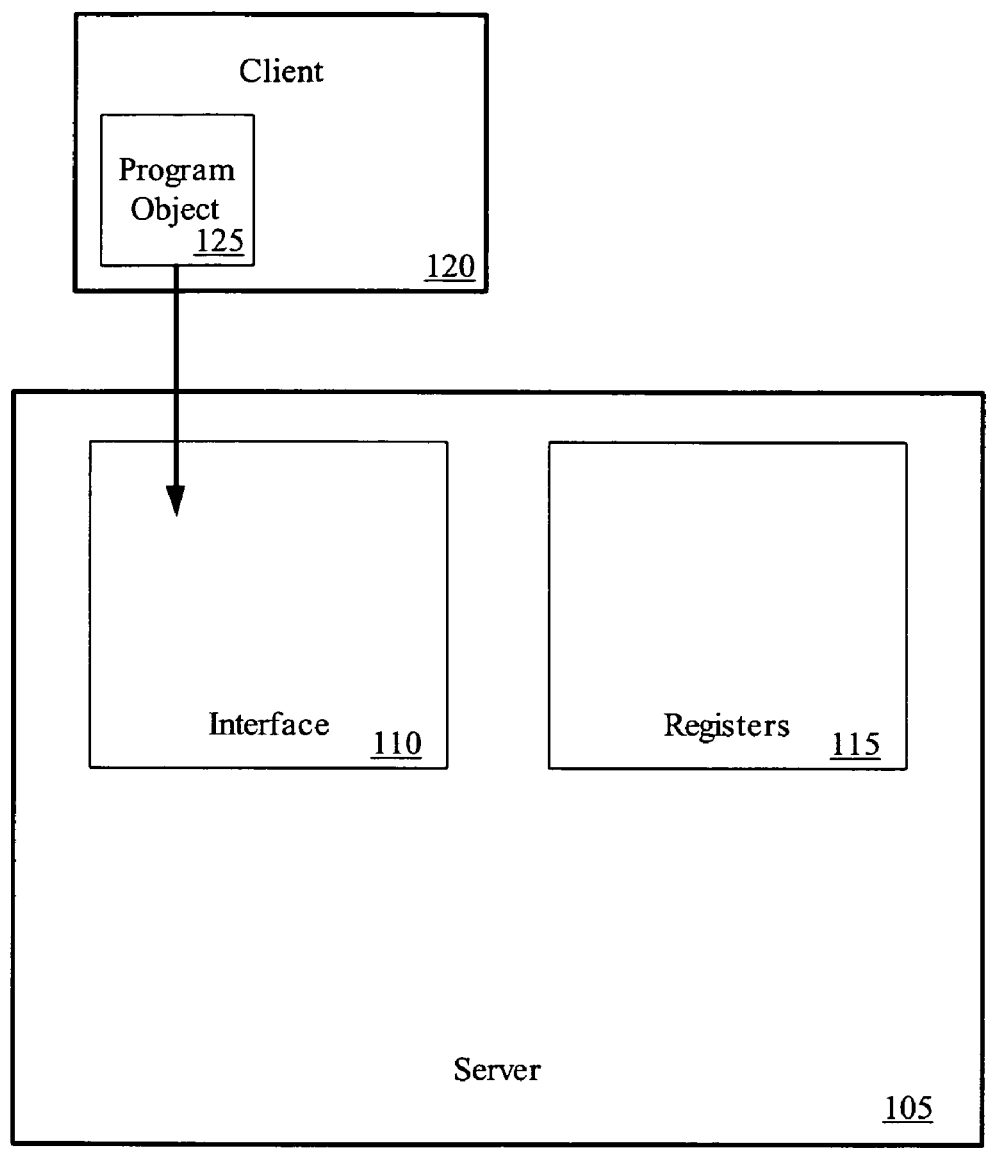
FIG. 1 is an illustration of an embodiment of system management by a client.

Embodiments of the invention are generally directed to a system and method for implementation of application management operations.

As used herein, "snap-in" means a program or application, such as a program object, that may be attached to another program or application and that will function as if it is a part of the program or application to which it is attached.

As used herein, "Web service" means a software application assessable in a web environment. Web service includes the term as used by the World Wide Web Consortium (W3C) in applicable standards.

In one embodiment of the invention, a server has a registry associated with it, the registry to include registers for management operations of systems on the server. In one embodiment of the invention, a program object or component is used in a client system for connection to a server. For example, the component may be a snap-in or similar object for connection with an interface. In one embodiment, a system registry is provided for use of the object and the use of an interface to a server. In this embodiment, the object and the interface use the system registry at least in part to communicate information regarding systems to be managed.

In one embodiment of the invention, a registry is used to provide data regarding a system to be managed by a client. In one embodiment, the registry is a standardized directory that may be accessed by many different types of client systems. In one embodiment, an interface to a server writes data regarding a system on the server to the registry. A program object for a client may read the data from the registry, thereby obtaining information regarding the operation of the system. In one embodiment, the interface is a web service that is accessible to multiple types of systems.

In one embodiment, a registry contains information regarding systems to be managed. In one example, the registry may contain information identifying the host that is running a system. In one example, the registry may include basic attributes of a system, with the basic attributes including information such as information regarding the current version of the system and information regarding how a client may connect to the system.

In one embodiment of the invention, a registry comprises a LDAP (Lightweight Directory Access Protocol) directory, a standardized directory structure. LDAP is a protocol for on-line directory services. An LDAP directory entry includes a collection of attributes with a name, called a distinguished name (DN). The DN provides an unambiguous designation for an entry. Each of the attributes of a directory entry will have a type and one or more values. A type provides a name for a particular type data. The values will depend on the type. In common usage for a directory, a type could include, for example, an address, with the value including the actual address. In one embodiment of the invention, the management of a system by a client may utilize an entry for the system in an LDAP directory.

LDAP defines a process to make use of X.500 directories, with X.500 designating the set of ITU-T (the telecommunications standards sector of the International Telecommunications Union) standards for electronic directory services. LDAP defines a simple protocol for updating and searching directories.

LDAP defines a message protocol that is used by directory clients and directory servers. The protocol operates using certain messages. For example, at the commencement of a connection a bindRequest message is sent from a client to a LDAP server. In another example, in order to search an LDAP directory for entry a searchRequest message is sent. LDAP provides a standard method for accessing and updating information, which thus can be used in a variety of different settings. In one embodiment of the invention, a client includes a snap-in object that provides messages to an LDAP directory.

LDAP has developed through multiple versions, including Version 3. LDAP is defined by a number of RFC standards of the Internet Engineering Task Force (IETF), which may include RFC 2251: Lightweight Directory Access Protocol (v3), December 1997; RFC 2252: Lightweight Directory Access Protocol (v3): Attribute Syntax Definitions, December 1997; RFC 2253: Lightweight Directory Access Protocol (v3): UTF-8 [8-bit Unicode Transformation Format] String Representation of Distinguished Names, December 1997; RFC 2254: The String Representation of LDAP Search Filters, December 1997; RFC 2255: The LDAP URL [Uniform Resource Locator] Format, December 1997;. RFC 2256: A Summary of the X.500 (96) User Schema for use with LDAP v3, December 1997; RFC 2829: Authentication Methods for LDAP, May 2000; RFC 2830: Lightweight Directory Access Protocol (v3): Extension for Transport Layer, May 2000; RFC 3377: Lightweight Directory Access Protocol (v3): Technical Specification, September 2002; and RFC 3673: Lightweight Directory Access Protocol version 3 (LDAPv3): All Operational Attributes, December 2003.

An object, such as a snap-in, may be designed to function as a modular component of another application. In one embodiment of the invention, a program object is a modular component of an interface to a server. In one embodiment, the interface is a web service, which thus can be accessed by multiple difference types of platforms. In one embodiment, multiple platforms use the same type of object to access the interface, thereby providing for ease of access and integration of a system.

Snap-ins or similar objects may be used in management operations. For example, snap-ins are basic components of Microsoft's Management Console (MMC). In such a system, the snap-ins may act as the actual management tools, while the management console or host is a framework for the snap-ins are added. For example, a console in MMC is a container for actual operations, and is known as a "tools host", acting as a framework in which management tools can operate. MMC is an application that provides a graphical-user interface (GUI) and a programming framework in which consoles can be created, saved, and opened. In a MMC environment, a user may select from a list of all installed snap-ins. Multiple copies of a particular snap-in can be added to apply to separate workstations. Snap-ins for MMC may be produced by many different vendors, and users may develop snap-ins to for management processes in their systems and custom applications. To create a console, an administrator runs the MMC executable file to open an empty console and chooses from among a list of all the tools installed on the system. Because consoles exist as files, an administrator can create them and then send them as, for example, e-mail attachments to developers responsible for specific tasks.

In an embodiment of a web application server, a startup and control framework may be utilized to start, stop, and monitor a system such as a J2EE (Java 2 Platform, Enterprise Edition) instance. The framework may be used to monitor and control an application remotely. In one embodiment of the invention, a web service is used in the startup and control framework. In one embodiment, a single startup and control framework may be addressed by multiple types of client systems for application monitoring and control. In one embodiment, a platform independent framework is provided for external management of systems. In an embodiment, an application server (a component server that is compliant with the J2EE environment) may be accessed by multiple different client systems using the same interface.

In one embodiment of the invention, a startup and control program, such as, for example, the Jcontrol program utilized in a product produced by SAP AG (SAP), is started through a web service interface. In an embodiment, the web service interface may start the startup and control program regardless of the type of platform utilized by a client. In one example, a managed system may comprise a J2EE instance. The startup and control program may initialize and monitor the J2EE instance, continuously checking the status of the elements of the instance and restarting any terminated processes.

In general, a web service provides a software system designed to support interoperable machine-to-machine interaction over a network. Web services conform to certain standards and thus provide a means of communication between applications on different platforms. Web services provide a mechanism for applications to communicate and interrelate in a platform independent fashion. Web services therefore may enable a service-oriented architecture in which certain services are reusable and transferable among heterogeneous environments, providing a common method for actions such as accessing data, providing instructions, and instituting other such actions.

Under an embodiment of the invention, a web service interface is implemented in a J2EE (Java 2 Platform, Enterprise Edition) platform. The J2EE platform is described in the J2EE specification, including as provided in version 1.4, Nov. 24, 2003. The implementation of a web service in a J2EE platform assists in providing portability of the client management processes.

The standards that are followed in web services include the use of XML (eXtensible Mark-up Language) for communication, including Extensible Markup Language (XML) 1.0 (Third Edition), Feb. 4, 2004, by the World Wide Web Consortium (W3C); SOAP (simple object access protocol) for the exchange of information, including SOAP Version 1.2, Jun. 24, 2003 by the W3C; WSDL (web services description language) for description of web service details, including Web Service Description Language Version 2.0, Aug. 3, 2003 by the W3C; and UDDI (universal description, discovery, and integration) for looking up web services, including Universal Description, Discover, and Integration Version 3.0. Numerous other specifications and recommendations may affect the structure and design of a web service. A web service has an interface that is described in a machine-processable format, with such format being WSDL. Other systems will interact with a web service in the manner that is prescribed in the web service's description using SOAP-messages, which are typically conveyed using HTTP (Hypertext Transfer Protocol).

Under an embodiment, a web service interface for monitoring systems is implemented using an open source product. In one embodiment, a system is implemented with SOAP, which is a light-weight protocol for exchanging messages between computer software. SOAP is intended to provide an extensible and decentralized framework that can work over multiple computer network protocol stacks. In this regard, remote procedure calls can be modeled as an interaction of several SOAP messages. SOAP can be run on top of all Internet protocols, but SOAP is commonly run on HTTP, as provided by W3C.

In general, any web service enabled client that can handle XML-RPC (Remote Procedure Calling) encoded communications may access a web service interface. XML-RPC includes a set of implementations to allow software running on disparate operating systems in different environments to make procedure calls over the Internet. The XML-RPC is defined by the relevant specification, XML-RPC Specification, Jun. 15, 1999. The applicable clients may include, but are not limited to, C/C++, Microsoft.NET, JAVA, and numerous other clients.

For the purposes of web services, when one application is to allow connection and access by other applications, the process is described utilizing WSDL. WSDL is used to specify details of a web service, thereby allowing an external system to utilize the web service without prior knowledge of details of the web service. WSDL provides a format that describes a network service as a set of endpoints operating on messages containing either document-oriented or procedure-oriented information. A WSDL document defines services as collections of network endpoints, or ports. In WSDL, the abstract definition of endpoints and messages is separated from the defined network deployment or data format bindings. This process thereby allows the reuse of abstract definitions, the definitions being messages, which are abstract descriptions of the data being exchanged, and port types, which are abstract collections of operations. The concrete protocol and data format specifications for a particular port type constitute a reusable binding. A port is defined by associating a network address with a reusable binding, with a collection of ports defining a service. In the provision of a web service, a WSDL document uses the following elements in the definition of services:

(a) Types—A container for data type definitions using a type system;

(b) Message—An abstract, typed definition of data being communicated;

(c) Operation—An abstract description of an action supported by the service;

(d) Port Type—An abstract set of operations supported by one or more endpoints;

(e) Binding—A concrete protocol and data format specification for a particular port type;

(f) Port—A single endpoint defined as a combination of a binding and a network address; and (g) Service—A collection of related endpoints.

FIG. 1 is an illustration of an embodiment of system management by a client. In the illustrated example, a server 105 includes an interface 110 and a set of registers 115. The server 105 may provide connection through the interface 110 for management functions. In one example, the server 105 may be connected with multiple client systems that may utilize different system platforms. In one embodiment of the invention, client 120 connects with the interface 110 using a program object 125. In this embodiment, the interface 110 is an interface that allows connection with multiple different types of systems. The program object 125 acts as a component of the interface 110 for management purposes, with the program object providing the management capabilities for the clients and the interface providing a framework for the operation of the program object 125.

In one embodiment, management operations of the program object 125 and the interface 110 may include the use of the set of registers 115. The program object 125 and the interface 110 use the set of registers 115 to communicate information regarding a system to be managed by the client 120.

Figure 2:
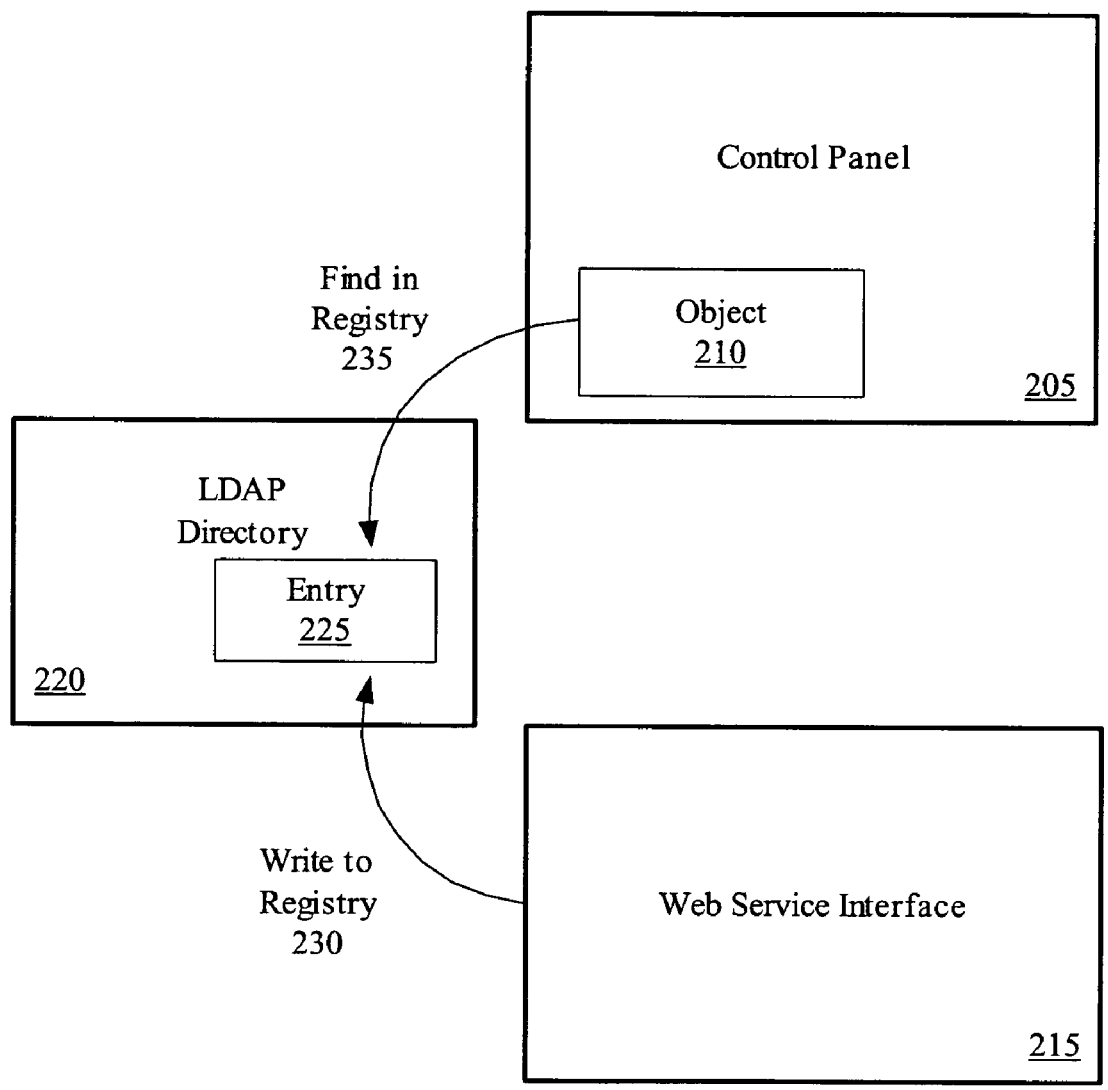
FIG. 2 is an illustration of an embodiment of management operations using a registry.

FIG. 2 is an illustration of an embodiment of management operations using a registry. In FIG. 2, a control panel 205 includes an object 210. The control panel 205 may be provided for a client system. The program object 210 is provided to enable communication with a web service interface 215. The web service interface 215 may be provided for a server. In one example, the object 210 may be used to provide management services.

An LDAP registry 220 is provided to enable certain communications between the object 210 with the web service interface 215, with an entry 225 in the LDAP registry 220 being established to provide information regarding the management of an application or system. For example, the web service interface 215 may provide information regarding management of an application or system in the entry 225. In one example, the web service interface 215 writes to the entry 230, such as to provide data regarding a managed system. The object 210 reads from the register 235 to obtain the data. Through use of the LDAP registry 220 many different types of clients may access the data regarding system management.

Figure 3:
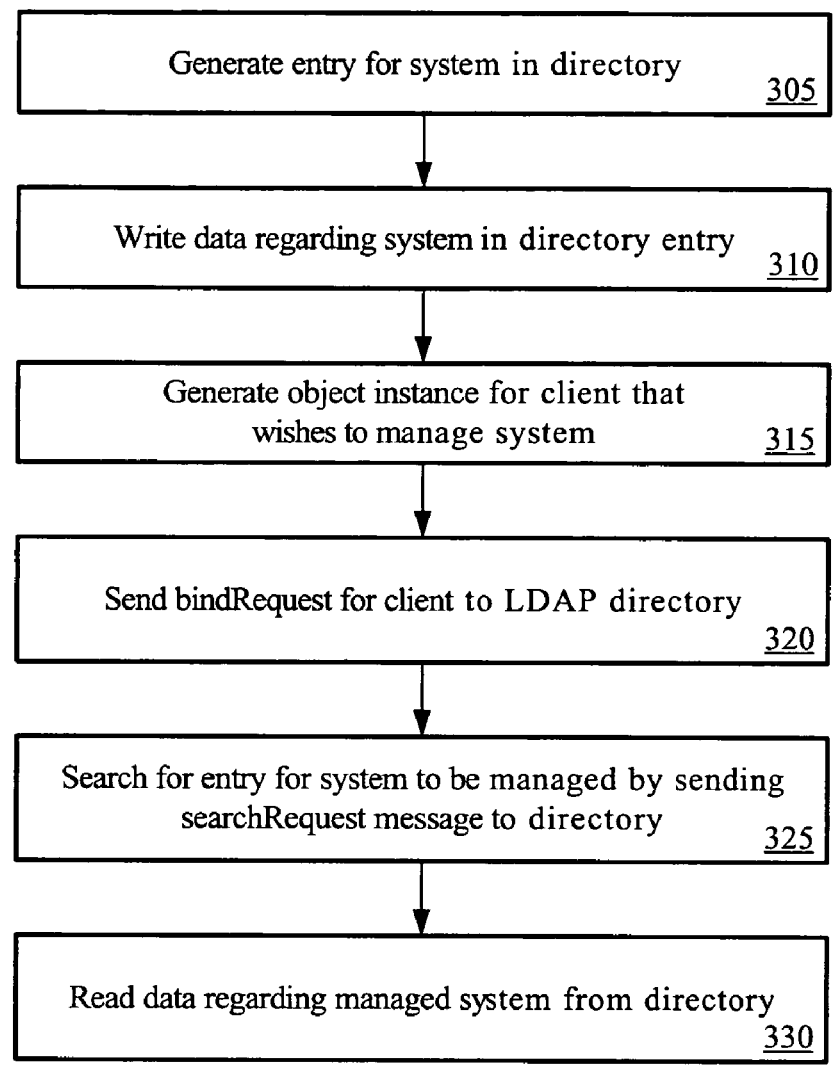
FIG. 3 is a flow chart to illustrate an embodiment of application management.

FIG. 3 is a flow chart to illustrate an embodiment of application management. In this figure, an entry for a system is generated in a directory 305, with the entry to be used for management of a system. Data regarding the system is written in the directory entry 310. The entry may include multiple attributes. An object may be generated for a client that wishes to manage the system 315. The object may send a bindRequest message to the LDAP directory 320. A search is conducted for the entry for the system that is to be managed, which may be accomplished by sending a searchRequest message from the object to the directory 325. The data regarding the system is read from the directory 330, which may be used by the client to manage the system remotely.

Figure 4:
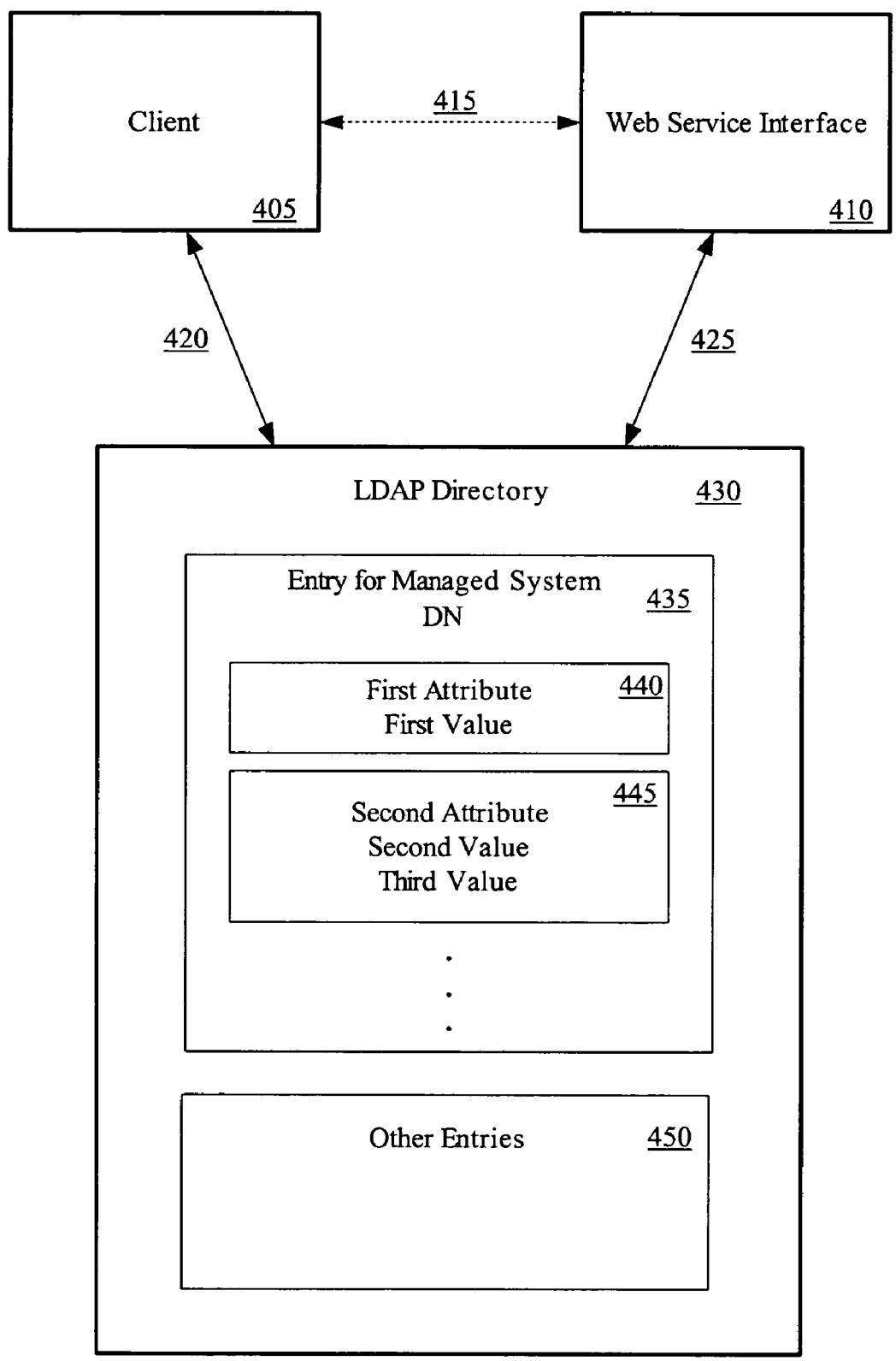
FIG. 4 is an illustration of an embodiment of a directory that may be used in management of a system.

FIG. 4 is an illustration of an embodiment of a directory that may be used in management of a system. In this illustration, a client 405 and a web service interface 410 are intended to communicate 415 for the purpose of management of a system. To assist in such communication, an LDAP directory 430 is used to provide information regarding the managed system. The LDAP directory 430 includes an entry for the managed system 435, and may include multiple other entries 450. As indicated, the entry 435 has a DN (distinguished name) to provide a unique descriptor for the entry. The entry 435 includes certain attributes that may be used to contain information relevant to the management of the system. The attributes may include a first attribute 440, which, for example, include a first value, which could include information regarding which of a number of servers is hosting the system. The attributes may further include a second attribute 445, which may contain information regarding the attributes of the system. For example, a second value may identify the version of the system, and a third value may provide information regarding how a client is to connect to the system.

Figure 5:
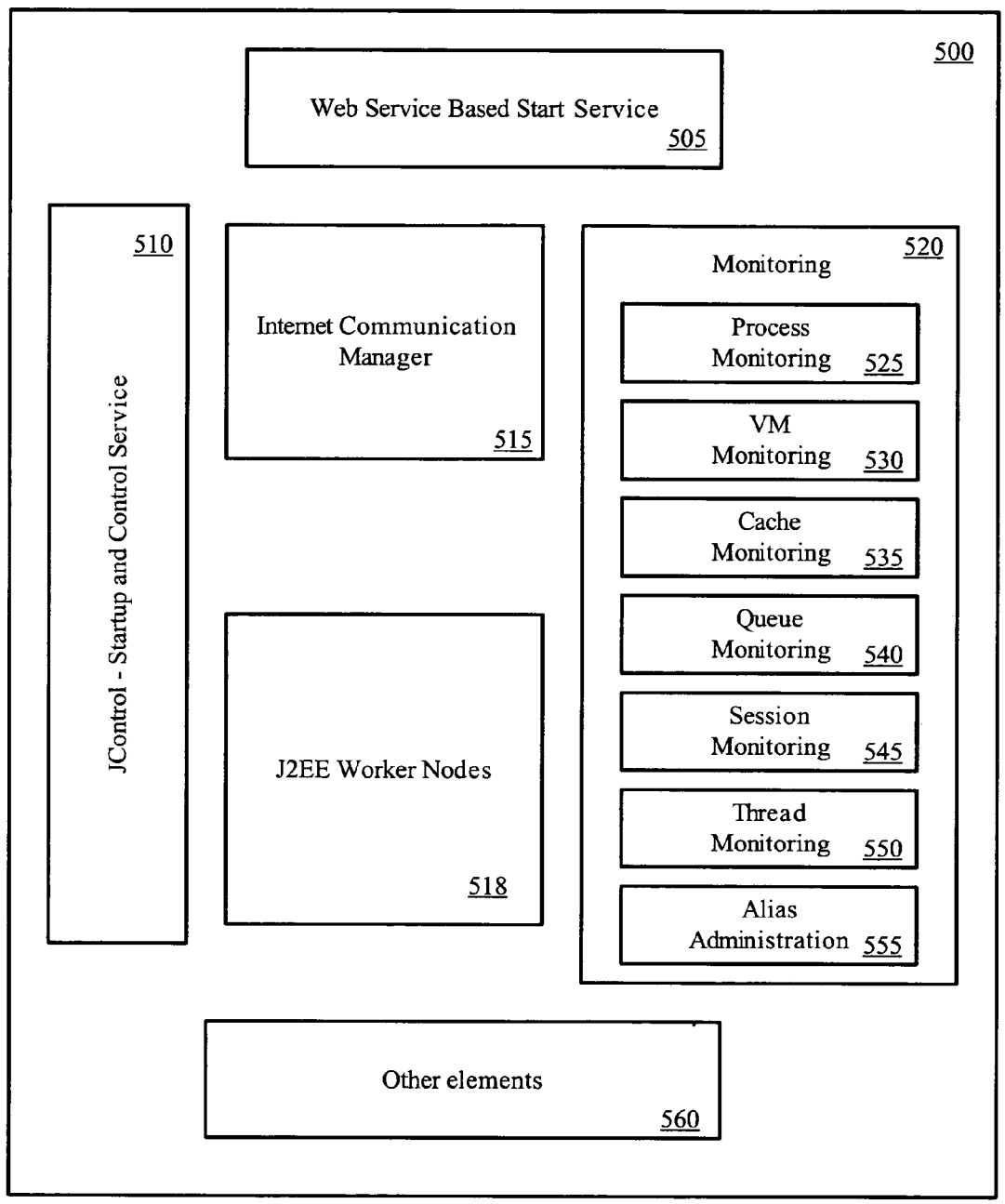
FIG. 5 is an illustration of an embodiment of an externally managed J2EE instance.

FIG. 5 is an illustration of an embodiment of an externally managed J2EE instance. In this illustration, a J2EE instance 500 includes a web service based start service 505 that operates in conjunction with a universal interface for multiple different types of client platforms. For any supported platform, the web service based start system 505 will initiate a startup and control service 510. The startup and control service 510 may then provide startup and control of J2EE worker nodes 518. In one embodiment, the web service based start service 505 may accept connection with a client, such as with the attachment of a snap-in of a client. The client may connect with the web service based start service 505 in order to externally manage a system or application.

FIG. 5 also illustrates an Internet communication manager 515 to provide communications for the instance 500. Further, there is shown monitoring elements 520 to monitor operations of the instance 500. The monitoring 520 may include, but is not limited to, process monitoring 525, virtual machine (VM) monitoring 530, cache monitoring 535, queue monitoring 540, session monitoring 545, thread monitoring 550, and alias administration 555. Other elements 560 may also be included in the J2EE instance 500.

Figure 6:
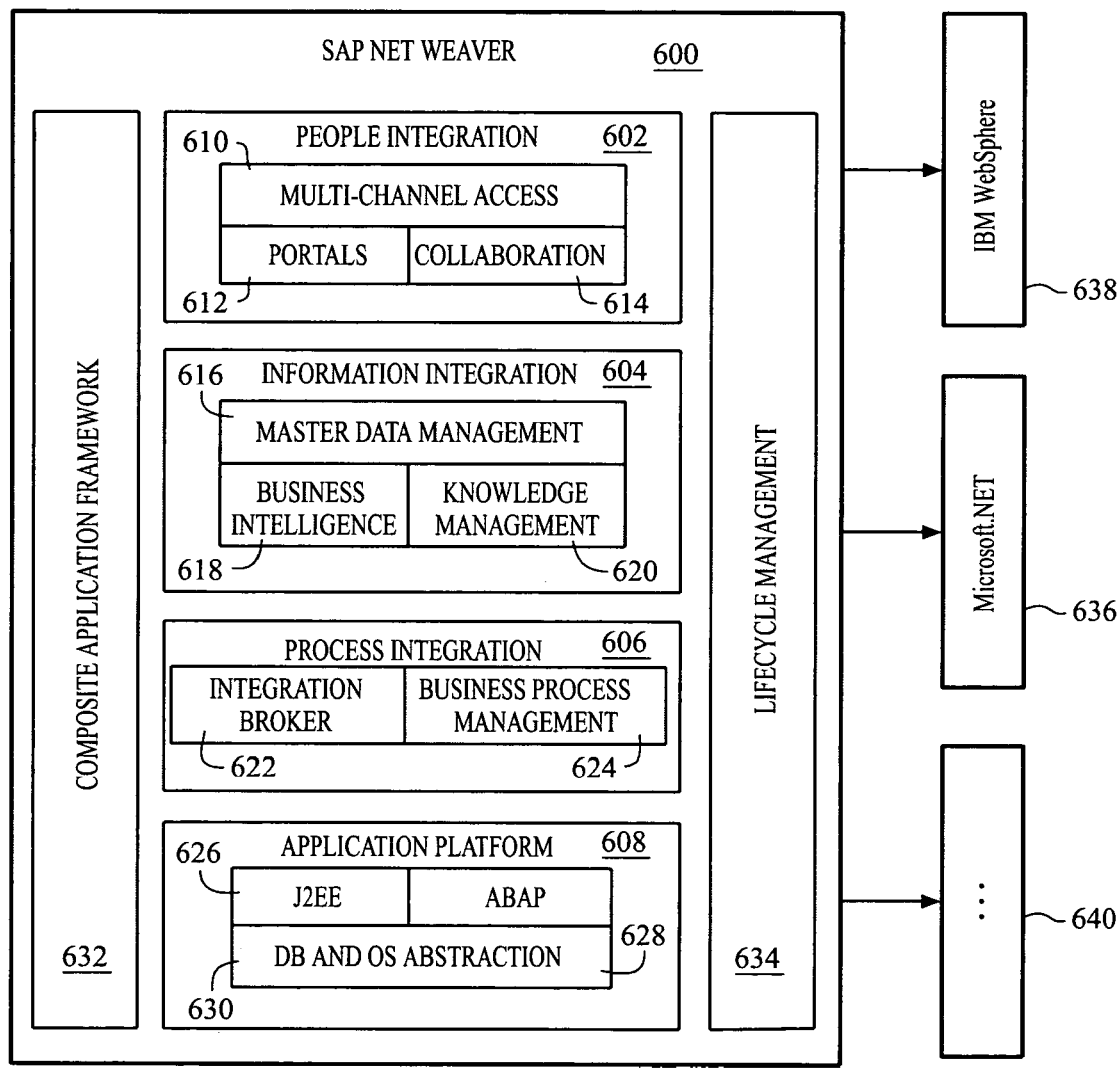
FIG. 6 is a diagram illustrating an embodiment of a system architecture.

FIG. 6 is a diagram illustrating an embodiment of a system architecture. In one embodiment, the diagram illustrates core components of the SAP NetWeaver architecture 600, in which a web service interface for external management may be implemented. The system architecture 600 comprises various SAP platforms that are merged together to provide the integration of people, information, and processes in one solution. The architecture 600 includes people integration 602, information integration 604, process integration 606, and an application platform 608.

People integration 602 is performed using a portal solution 612 and a platform to work in collaboration 614. Users are provided a multi-channel access 610 to ensure mobility. Examples of the portal solution 612 include SAP Enterprise Portal, SAP Mobile Engine, and Collaboration Package for SAP Enterprise Portal. Information integration 604 refers to the conversion of information into knowledge. Information integration 604 provides efficient business intelligence 618 and knowledge management 620 using, for example, SAP products such as Business Information Warehouse (BW) and Knowledge Management (KM). Further, consolidation of master data management beyond system boundaries is performed using SAP's Master Data Management (MDM) 616. Process integration 606 refers to optimized process management using integration broker or SAP exchange infrastructure 622 and business process management 624 techniques. Examples of products to perform process integration 606 include Exchange Infrastructure (XI) and Business Process Management (BPM).

An application platform 608 may include SAP's Web Application Server (Web AS), which is the basis for SAP applications. Web AS, which may be independent of the database and operating system 630, includes a J2EE engine 626 in combination with the proprietary ABAP (Advanced Business Application Programming) engine or instance 628 to further enhance the application platform 608. In one embodiment, the application platform 608 includes operation of a web service to provide an interface for heterogeneous external clients to manage systems provided by the application platform 608. In one embodiment, the web service may act as a framework to connect client agents to the application platform.

The architecture 600 further includes a composite application framework 632 to provide various open interfaces (APIs) and a lifecycle management 634, which is an extension of a previously existing transport management system (TMS). As illustrated, the architecture 600 further provides communication with Microsoft.NET 636, International Business Machine (IBM) WebSphere 638, and other such systems 640.

Figure 7:
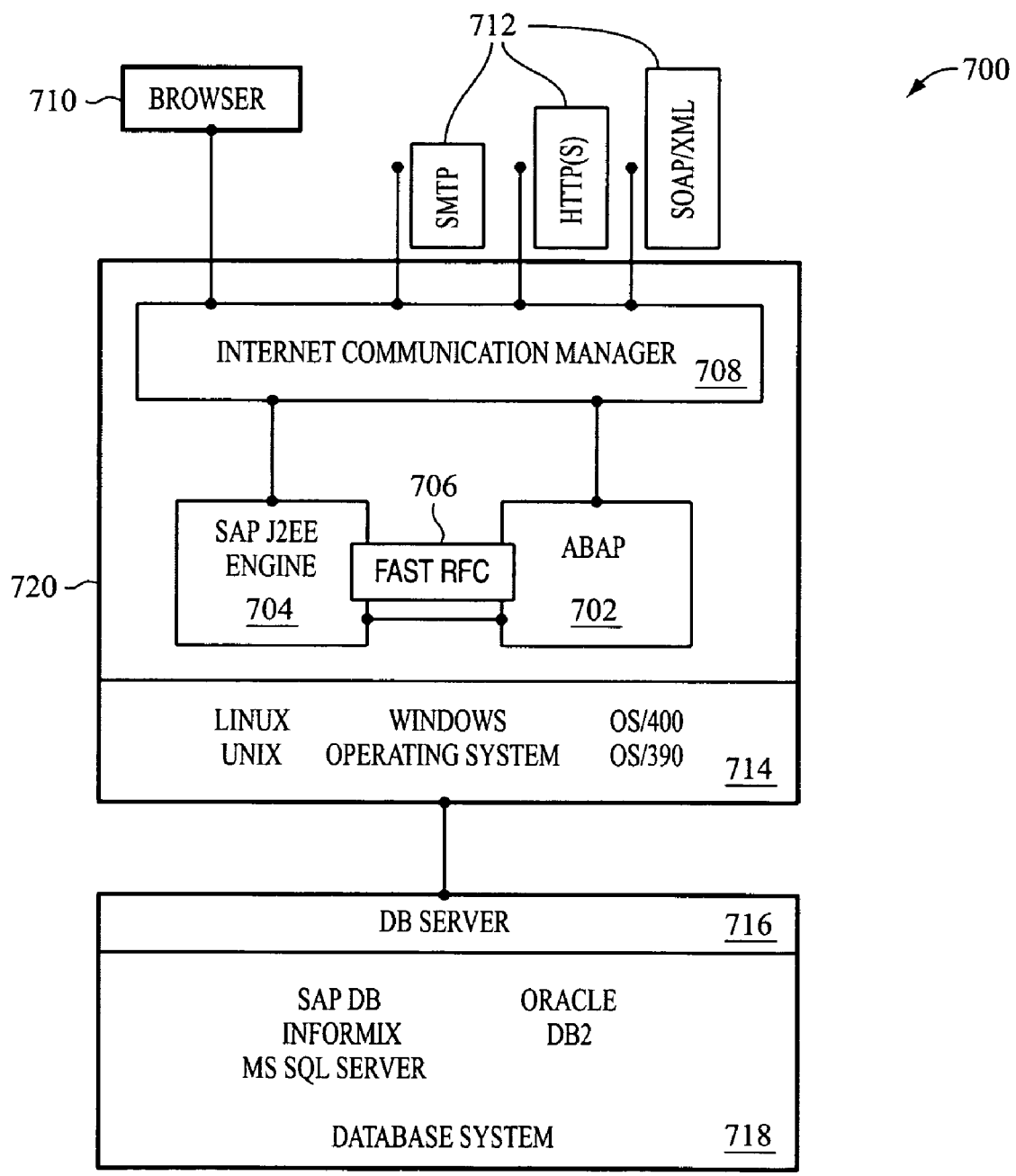
FIG. 7 is a block diagram illustrating an embodiment of an architecture including a Web Application Server.

FIG. 7 is a block diagram illustrating an embodiment of an architecture including a Web Application Server. In this illustration, an architecture 700 serves as an application platform (which may be, for example, the application platform 608 of provided in FIG. 2) for SAP NetWeaver and other SAP products. The architecture 700 includes a Web AS 720 having an ABAP program engine 702, which provides the ABAP development and runtime environment, with the dependability, scalability, and inter-process independence of operating systems 714 and database systems 718. The operating system 714 may include LINUX, UNIX, Windows, OS/390, OS/400, and other such operating systems. The database system 718 may include SAP database (SAP DB), Informix, Oracle, DB2, and other such database systems. The database system 718 is based on a database server 716, such as Microsoft Sequential Query Language (MS SQL) server.

The Web AS 720 with ABAP engine 702 further includes a J2EE program engine 704. The J2EE may support one or more program instances. The J2EE engine 704 is in communication with the ABAP engine 702 via a fast Remote Function Call (RFC) connection 706. The ABAP engine 702 and the J2EE engine 704 are further in communication with an Internet Communication Manager (ICM) 708. The ICM 708 is provided for handling and distributing queries to various individual components of the architecture 700. The architecture 700 further supports a browser 710, such as Microsoft Internet Explorer, Netscape Navigator, and other modified variations of mobile end devices, such as personal digital assistants (PDAs), pocket computers, smart cell phones, other hybrid devices, and the like. The Web AS 720 also supports various protocols and standards 712, such as HyperText Markup Language (HTML), eXtensible Markup Language (XML), Wireless Markup Language (WML), Hypertext Transfer Protocol (HTTP) and Hypertext Transfer Protocol, Secure (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like. In one embodiment, the supported protocols 712 include SOAP and XML for the operation of web service to provide an interface for external management of systems on the Web AS 720. In one embodiment, the web service is a framework for snap-ins or other program objects, with the objects being used to connect external managers with the web service.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. An embodiment may include a computer-readable medium having stored thereon data representing sequences of instructions that, when executed by a processor, cause the processor to perform certain operations.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A server comprising:
   a processor to execute instructions;
   a set of registers for the storage of information to be communicated;
   an interface, the interface to connect with a component of each of a plurality of clients, wherein the plurality of clients includes a first client having a first computer platform and a second client having a second computer platform that is different than the first computer platform;
   a start up and control service, the start up and control service to be started by the interface, wherein the start up and control service is a single service for the management of applications for the plurality of clients, and wherein the startup and control service is to respond to requests from the plurality of clients for information regarding applications; and
   an application for execution to be managed by a connected component of one of the plurality of clients via the start up and control service through the interface, the start up and control service to initialize and monitor the application;
   wherein the set of registers is utilized to provide a registry, the registry including an entry for the application to be managed, the entry including one or more attributes for the management of the application, wherein the start up and control service is to obtain information from the set of registers to respond to requests for information from the plurality of clients.

2. The server of claim 1, wherein the interface comprises a web service interface.

3. The server of claim 1, wherein the server is an application server that is compatible with J2EE (Java 2 Platform, Enterprise Edition).

4. The server of claim 3, wherein the application server includes a container, the application being contained in the container.

5. The server of claim 1, wherein the registry is an LDAP (Lightweight Directory Access Protocol) directory.

6. The server of claim 1, wherein management of applications includes one or more operations selected from the group consisting of checking the status of elements of the application and restarting terminated processes of the application.

7. A method comprising:
   generating one or more entries in a directory for an application to be executed by a processor, and storing the one or more entries in a set of one or more registers, the one or more entries including one or more attributes for the management of the application, the one or more entries including an entry containing an identity of a host that is running the application;
   receiving a request at a server interface of a startup and control framework, the request being received from a program object of a first client of a plurality of clients, the received request asking to connect the program object of the first client to the start up and control framework to manage the application, the plurality of clients including the first client running on a first computer platform and a second client running on a second computer platform, the second computer platform being different than the first computer platform, the server interface being compatible with both the first client and the second client;
   providing information to the requesting client regarding the application via the set of one or more registers, the information being based on the one or more entries in the directory, the information including information regarding one or more attributes of the application; and
   managing the application under control of the program object of the first client via the startup and control framework utilizing the information provided via the set of one or more registers.

8. The method of claim 7, wherein the directory comprises an LDAP (Lightweight Directory Access Protocol) directory.

9. The method of claim 7, wherein the request is generated by the program object of the first client.

10. The method of claim 7, wherein the server interface comprises a web service.

11. A computer-readable medium having stored thereon data representing sequences of instructions that, when executed by a processor, cause the processor to perform operations comprising:
   generating one or more entries in a directory for an application to be executed by a processor, and storing the one or more entries in a set of one or more registers, the one or more entries including one or more attributes for the management of the application, the one or more entries including an entry containing an identity of a host that is running the application;
   receiving a request from a program object of a first client of a plurality of clients, the request asking to connect the program object of the first client to the start up and control framework to manage the application, the request being received at an interface of a startup and control framework, the plurality of clients including the first client running on a first computer platform and a second client running on a second computer platform, the second computer platform being different than the first computer platform, the interface being compatible with both the first client and the second client; and
   providing information to the requesting client regarding the application via the set of one or more registers, the information being based on the one or more entries in the directory, the information comprising information regarding one or more attributes of the application; and
   managing the application under control of the program object of the first client via the startup and control framework utilizing the information provided via the set of one or more registers.

12. The medium of claim 11, wherein the directory comprises an LDAP (Lightweight Directory Access Protocol) directory.

13. The medium of claim 11, wherein the request is generated by the program object of the first client.

14. The medium of claim 11, wherein the interface comprises a web service.

15. The medium of claim 11, wherein managing the application includes one or more operations selected from the group consisting of checking the status of elements of the application and restarting terminated processes of the application.

16. The medium of claim 11, wherein the one or more attributes include attributes selected from the group consisting of:
   an attribute to identify a host that is running the application;
   an attribute to describe the current version of the application; and
   an attribute describing how a client may connect to the application.

17. The server of claim 1, wherein the monitoring of the application includes one or more operations selected from the group consisting of checking the status of elements of the application and restarting terminated processes of the application.

18. The server of claim 1, wherein the one or more attributes include attributes selected from the group consisting of:
   an attribute to identify a host that is running the application;
   an attribute to describe the current version of the application; and
   an attribute describing how a client may connect to the application.

19. The method of claim 7, wherein managing the application includes one or more operations selected from the group consisting of checking the status of elements of the application and restarting terminated processes of the application.

20. The method of claim 7, wherein the one or more attributes includes one or more selected from the group consisting of:
   an attribute to identify a host that is running the application;
   an attribute to describe the current version of the application; and
   an attribute describing how a client may connect to the application.

21. A system comprising:
   a server comprising:
      a processor to execute instructions;
      a set of registers for the storage of information to be communicated;
      a web service interface, the web service interface to connect with a component of a first client of a plurality of clients, the plurality of clients including the first client having a first computer platform and a second client having a second computer platform that is different than the first computer platform, and
      a single start up and control service, wherein the start up and control service is a single service for the management of applications for the plurality of clients, and wherein the startup and control service is to respond to requests from the plurality of clients for information regarding applications, the web service to start the single start up and control program regardless of which of the plurality of clients is the connected client, the component of the connected client to manage an application using the start up and control service; and
   wherein the set of registers is utilized to provide a registry, the registry including an entry for the application, the web service interface to write data regarding the application in the entry for the application and to obtain information from the registry to respond to requests for information from the plurality of clients, the data to include one or more attributes of the application, the component of the first client to manage the application through the setup and control service.

22. The system of claim 21, wherein the application comprises a J2EE (Java 2 Platform, Enterprise Edition) instance.

23. The system of claim 22, wherein the management of the application includes one or more operations selected from the group consisting of checking the status of elements of the J2EE instance and restarting terminated processes of the J2EE instance.

24. The system of claim 22, wherein the one or more attributes includes one or more selected from the group consisting of:
   an attribute to identify a host that is running the J2EE instance;
   an attribute to describe the current version of the J2EE instance; and
   an attribute describing how a client may connect to the J2EE instance.

* * * * *